(12) United States Patent
Laroia et al.

(10) Patent No.: US 8,457,054 B2
(45) Date of Patent: Jun. 4, 2013

(54) APPARATUS AND METHOD FOR USE IN PAGING MODE IN WIRELESS COMMUNICATIONS SYSTEMS

(75) Inventors: Rajiv Laroia, Basking Ridge, NJ (US); Junyi Li, Bedminster, NJ (US); Sathyadev Venkata Uppala, Scotch Plains, NJ (US)

(73) Assignee: Alcatel Lucent, Paris (FR)

( * ) Notice: Subject to any disclaimer, the term of this patent is extended or adjusted under 35 U.S.C. 154(b) by 1734 days.

(21) Appl. No.: 10/895,720

(22) Filed: Jul. 21, 2004

(65) Prior Publication Data

US 2004/0258084 A1 Dec. 23, 2004

Related U.S. Application Data

(62) Division of application No. 09/756,384, filed on Jan. 8, 2001, now Pat. No. 6,823,191.

(51) Int. Cl.
*H04W 72/04* (2009.01)
*H04W 68/02* (2009.01)
*H04J 3/16* (2006.01)
*H04J 12/43* (2006.01)

(52) U.S. Cl.
USPC .......... 370/329; 370/437; 370/458; 455/458; 455/434

(58) Field of Classification Search
USPC ................. 370/337, 229, 336, 313–314, 437, 370/459, 329, 341–342; 455/458, 450, 434
See application file for complete search history.

(56) References Cited

U.S. PATENT DOCUMENTS

| 5,511,110 | A | * | 4/1996 | Drucker | 455/458 |
| 5,596,315 | A | * | 1/1997 | Olds et al. | 340/7.2 |
| 5,604,744 | A | * | 2/1997 | Andersson et al. | 370/347 |
| 5,905,965 | A | * | 5/1999 | Asano et al. | 455/574 |
| 6,091,960 | A | * | 7/2000 | Raith et al. | 455/458 |
| 6,157,816 | A | * | 12/2000 | Anderson et al. | 340/7.32 |
| 6,332,006 | B1 | * | 12/2001 | Rydbeck et al. | 375/262 |
| 6,421,540 | B1 | * | 7/2002 | Gilhousen et al. | 455/458 |
| 6,438,375 | B1 | * | 8/2002 | Muller | 455/435.3 |
| 6,449,491 | B1 | * | 9/2002 | Dailey | 455/518 |
| 6,532,224 | B1 | * | 3/2003 | Dailey | 370/337 |
| 6,647,005 | B1 | * | 11/2003 | Cao et al. | 370/342 |
| 6,680,920 | B1 | * | 1/2004 | Wan | 455/458 |

* cited by examiner

*Primary Examiner* — Kwang B Yao
*Assistant Examiner* — Candal Elpenord
(74) *Attorney, Agent, or Firm* — Ryan, Mason & Lewis, LLP

(57) ABSTRACT

Latency in receiving and detecting paging messages at a wireless terminal is reduced by employing a unique "super" paging time slot format. A paging super time slot includes a plurality of prescribed time slots. Each wireless terminal is associated with cyclically recurring super time slots. A super slot is associated with one or more wireless terminals. A base station always selects the first available time slot in a super time slot to transmit a paging message to a wireless terminal that is associated with the super time slot. Each wireless terminal monitors every time slot in the associated super time slot until either detecting reception of its associated paging message or detecting an empty time slot. In another embodiment of the invention, a unique partially overlapping super time slot format is employed in which a super time slot has at least one time slot common to its adjacent super time slots. This allows wireless terminals associated with adjacent super time slots to share the common at least one time slot. In turn, this results in balanced traffic loads, smoothed traffic fluctuation and reduced congestion.

20 Claims, 5 Drawing Sheets

200

NON-OVERLAPPING SUPER TIME SLOTS

PARTIALLY-OVERLAPPING SUPER TIME SLOTS

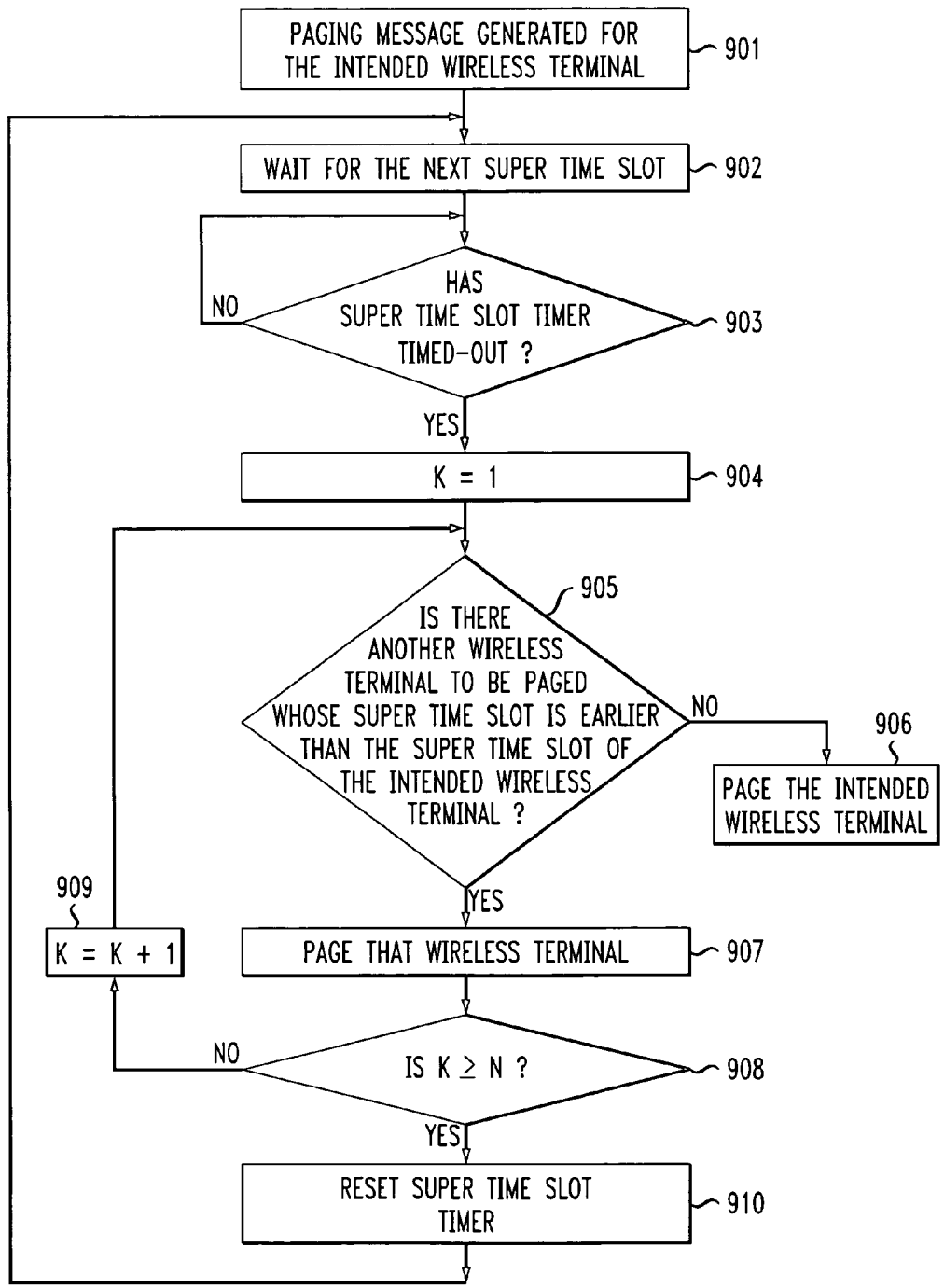

APPARATUS AND METHOD FOR USE IN PAGING MODE IN WIRELESS COMMUNICATIONS SYSTEMS

RELATED APPLICATIONS

This application is a divisional application of U.S. patent application Ser. No. 09/756,384, filed Jan. 8, 2001 now U.S. Pat. No. 6,823,191. U.S. patent application Ser. No. 09/774,311 and U.S. patent application Ser. No. 09/756,370 were filed on Jan. 8, 2001.

TECHNICAL FIELD

This invention relates to wireless communications systems and, more particularly, to wireless communications between wireless terminals and base stations.

BACKGROUND OF THE INVENTION

In wireless communications systems, wireless terminals can maintain connectivity to a base station without actively communicating with the base station. Such wireless terminals are referred to as being in a paging mode. In such a system, the wireless terminals (WTs) are paged by associated base stations (BSs) to initiate communications. In order to realize this, the base stations typically have a channel on the downlink called the paging channel. In prior known paging arrangements, the paging channel is subdivided into a plurality of paging time slots. A group of wireless terminals is typically allocated a paging time slot of a prescribed periodicity for receiving paging messages from associated base stations. As shown in FIG. 1, wireless terminals #1 and #2 are allocated to time slot A, wireless terminals #3 and #4 are allocated to time slot C, and so on. Each mobile unit is expected to monitor for paging messages from an associated base station during these paging time slots. Thus, in the example shown in FIG. 1, wireless terminal #1 and #2 only monitor time slots A and B, while wireless terminals #3 and #4 only monitor time slots C and D, and so on. To this end, the periodicity of the paging time slots is made sufficiently long that the each of the wireless terminals can effectively turn off most of its circuitry between two of its designated paging time slots and, thus, save energy. This is referred to as the wireless terminal entering a so-called "sleep" mode. The wireless terminal, even though in the sleep mode, still has to keep track of the received paging time slots. The wireless terminal is caused to "wake up" prior to the arrival of its designated paging time slot, tunes to the downlink channel and achieves carrier, timing and frame synchronization. Then, the wireless terminal decodes the paging time slot and if its identifier is included in the wireless terminal's designated paging time slot, it knows that the page message is meant for it. The wireless terminal then takes the appropriate action indicated in the paging message. If the paging message is not meant for the wireless terminal, the wireless terminal returns to the "sleep" mode, and monitors the next received paging time slot designated to it.

As seen in FIG. 1, more than one wireless terminal shares the same paging time slot. The rationale for this is that in general paging messages for a particular wireless terminal do not arrive very often, and paging messages for different wireless terminals arrive at mutually independent time slots. Consequently, sharing of the so-called paging time slots among several wireless terminals is a more efficient way of utilizing the paging channel. A problem of sharing of the paging time slots among several wireless terminals, however, is that latency in receiving a paging message is increased when several paging messages arrive simultaneously for the wireless terminals sharing a particular paging time slot. For example, consider that paging messages arrive in time slot A of FIG. 1 for both wireless terminals #1 and #2, then the associated base station can only transmit one of the paging messages in time slot A, for example, the message for wireless terminal #1. Then, the base station must wait until time slot B to transmit the paging message for wireless terminal #2. Depending on the arrival rates of paging messages and the number of wireless terminals sharing a paging time slot, the latency may become undesirably long.

SUMMARY OF THE INVENTION

Problems and limitations of prior wireless communications systems paging arrangements are overcome, in one embodiment of the invention, by employing a unique paging "super" time slot format. A paging super time slot includes a plurality of prescribed time slots. Each wireless terminal is associated with cyclically recurring super time slots. A super slot is associated with one or more wireless terminals.

A base station always selects the first available time slot in a super time slot to transmit a paging message to a wireless terminal that is associated with the super time slot. Each wireless terminal monitors every time slot in the associated super time slot until either detecting reception of its associated paging message or detecting an empty time slot.

In another embodiment of the invention, a unique partially overlapping super time slot format is employed in which a super time slot has at least one time slot common to its adjacent super time slots. This allows wireless terminals associated with adjacent super time slots to share the common at least one time slot. In turn, this results in balanced traffic loads, smoothed traffic fluctuation and reduced congestion.

A technical advantage of the invention is that latency in a base station transmitting a paging message and, hence, in a wireless terminal receiving a paging message is significantly reduced.

BRIEF DESCRIPTION OF THE DRAWING

FIG. 9 is a flow chart illustrating the steps in a process of a base station generating and transmitting paging messages to wireless terminals.

DETAILED DESCRIPTION

Figure 2:
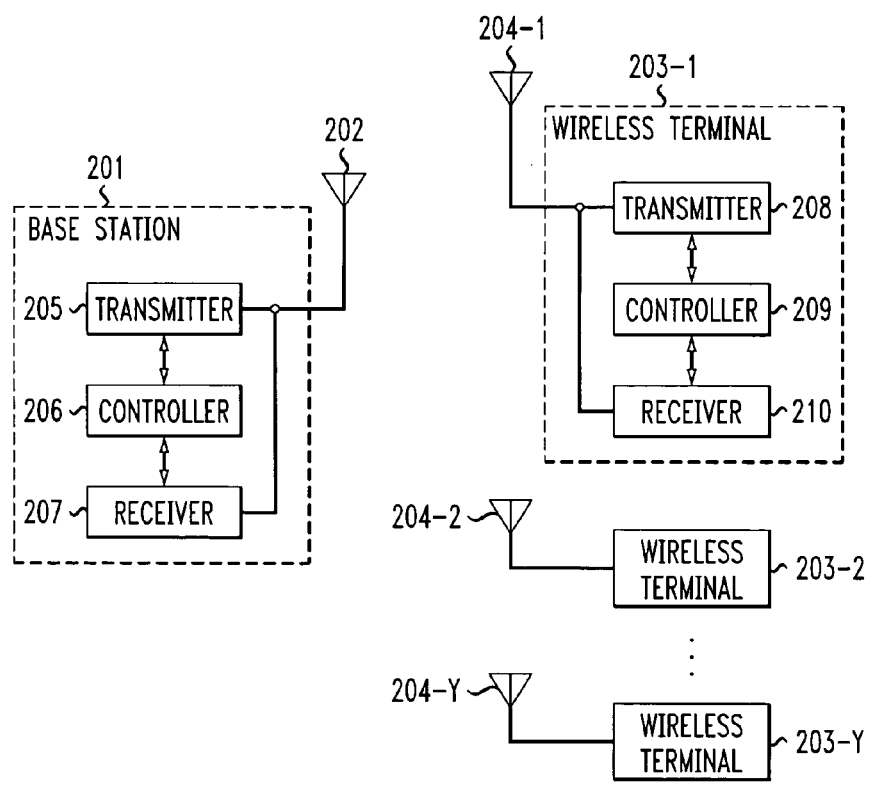
FIG. 2 shows, in simplified block diagram form, a wireless multiple access communications system in which the invention may be advantageously employed.

FIG. 2 shows, in simplified block diagram form, a wireless multiple access communications system in which the invention may be advantageously employed. It should be noted that although applicants' unique invention will be described in the context of a mobile wireless communications system, it has equal application to non-mobile, e.g. fixed, wireless communications systems. One such mobile wireless communications system is the Orthogonal Frequency Division Multiplexed (OFDM) based spread spectrum multiple access system.

Specifically, shown in FIG. 2 is a multiple access wireless communications system 200. System 200 includes base station 201 including antenna 202 and one or more remote wireless terminals, i.e., wireless terminals 203-1, 203-2 through 203-Y including associated antennas 204-1, 204-2 and 204-Y, respectively. Transmission of signals is from and to base station 201, to and from remote wireless terminals 203. All of wireless terminals 203 share the transmission spectrum in a dynamic fashion.

In this example, base station 201 includes transmitter 205, receiver 207 and controller 206 for transmitting and receiving wireless messages via antenna 202. Controller 206 is employed to control operation of transmitter 205 and receiver 207, in accordance with the invention. Similarly, in this example, each of wireless terminals 203-1 through 203-Y includes transmitter 208, receiver 210 and controller 209 for transmitting and receiving wireless messages via antenna 204. Controller 209 is employed to control operation of transmitter 208 and receiver 210, in accordance with the invention.

Figure 1:
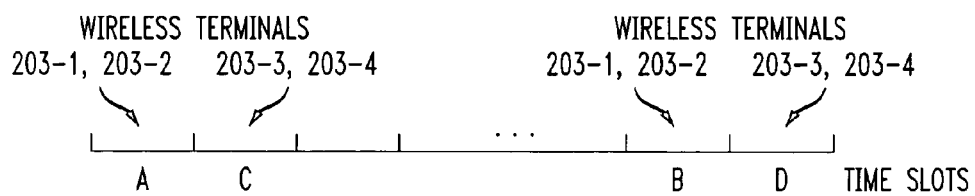
FIG. 1 shows a prior art time slot format used to transmit paging messages in wireless communications systems.

Base station 201 transmits paging messages to wireless terminals 203. Typically, wireless terminals 203 when not in use are in a standby mode commonly referred to as a "sleep" mode. In the sleep mode most of the circuitry in the wireless terminal 203 is turned off in order to conserve energy and, thereby, extend battery life. In order for each of the wireless terminals 203 to detect whether there is a paging message intended for it, the particular wireless terminal 203 must come out of the sleep mode, i.e., wake up, and monitor incoming time slots for an associated paging message. As indicated above, FIG. 1 illustrates a prior time slot format for communication of paging messages between base station 201 and wireless terminals 203. It is noted that since more than one wireless terminal 203 can share a time slot, it is possible for more than one paging message to arrive simultaneously for transmission to wireless terminals 203. Since the base station 201 can only transmit one paging message in a time slot, any additional paging messages must wait for subsequent time slots to be transmitted. Depending on the number of simultaneously arriving paging messages and the number of wireless terminals 203 sharing a time slot, delay in transmitting a particular paging message can be significantly long.

Figure 3:
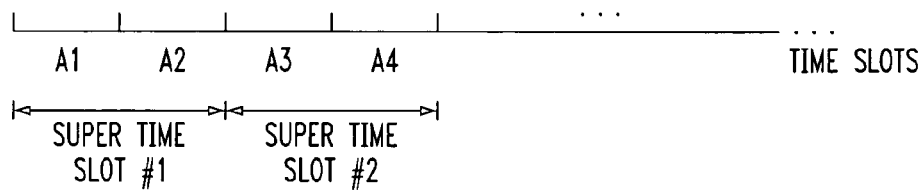
FIG. 3 shows a unique super time slot format in accordance with the invention.

FIG. 3 shows a unique super time slot format in accordance with the invention that significantly reduces latency in the transmission and reception of paging messages. As shown in FIG. 3, a plurality of prescribed time slots are grouped together into a super time slot, e.g., time slots A1 and A2 into super time slot #1 and time slots A3 and A4 into super time slot #2. These super time slots including appropriate paging messages are formatted and transmitted by base station 201 to wireless terminals 203. In this example, wireless terminals 203-1 through 203-4 share super time slot #1. To this end, a paging message is generated by base station 201 and inserted into a time slot of a super time slot associated with the current wireless terminal 203 intended to be paged. It should be noted that any desired number of time slots may be grouped into a super time slot and any desired number of super time slots may be in a cycle of a cyclically repeating super time slot format.

Note that by grouping time slots into super time slots, the probability of congestion at all time slots of any super time slot is significantly reduced because of statistical multiplexing. Consequently, the latency in a wireless terminal 203 receiving a paging message is significantly reduced. However, the wireless terminals 203 are required to monitor more individual time slots, thereby increasing its computational effort.

Figure 4:
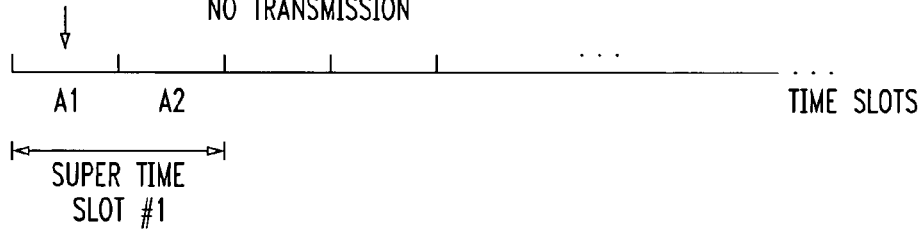
FIG. 4 also shows the unique super time slot format useful in describing the invention.

FIG. 4 also shows the unique super time slot format useful in describing the invention in reducing the wireless terminals 203 computational effort. In order to reduce the computational effort required in wireless terminals in monitoring the super time slots for paging messages, base station 201 and wireless terminals 203 follow a prescribed protocol when employing the super time slot format shown in FIG. 3. Specifically, base station 201 always employs the first available time slot to transmit paging messages to the wireless terminals 203. Each of wireless terminals 203 monitors its associated super time slot for paging messages and abandons monitoring either upon receiving a paging message directed to it or upon detecting an empty time slot. An empty time slot is defined as one in which no paging message has been transmitted.

The first available time slot for a paging message is the earliest time slot in a super slot associated with the intended wireless terminal that base station 201 is able to transmit the paging message. By way of an example, wireless terminals 203-1 through 203-4 share super time slot #1 which, in this example, includes time slots A1 and A2. Consider that in a current super time slot, base station 201 has a paging message to be sent to an intended wireless terminal 203-1. If in time slot A1, base station 201 has no other paging messages to be transmitted, base station 201, in accordance with the above-noted protocol, transmits the paging message in time slot A1, which is the first available time slot for the current paging message. If there are other paging messages to be sent in time slot A1 as well, base station 201 decides which paging message is to be sent in time slot A1. For example, if base station 201 decides to transmit the current paging message for wireless terminal 203-1 in time slot A1, then time slot A1 is the first available for the current paging message. Now if base station 201 had decided to transmit another paging message in time slot A1, then time slot A2 may be the first available time slot to transport the current paging message for wireless terminal 203-1. Furthermore, if base station 201 had decided to transmit other paging messages in time slots A1 and A2 in the current super time slot, then the first available time slot for the paging message for the intended wireless terminal 203-1 may be a time slot of the super time slot associated with wireless terminal 203-1 in the next cycle of the format. In the above examples of having more than one paging message to be sent to wireless terminals 203 in a time slot common to the super time slots associated with the wireless terminals 203, the paging messages are contending for the single common time slot. The contention for the time slot could be resolved on a random basis. However, this is somewhat undesirable. A better solution is to resolve the contention by a specific fixed process to achieve better system performance, such as reducing latency of transmitting paging messages. In accordance with the invention, a process is employed which allocates the common time slot to the paging message intended for the wireless terminal 203 whose super time slot is earliest among all wireless terminals. The super time slot that is earliest is described below in relationship to step 905 of FIG. 9.

Now assuming that base station 201 has no paging message to be transmitted in super time slot #1, then there is no transmission of a message in time slot A1 and the time slot is empty. Upon the associated wireless terminals, e.g., 203-1 through 203-4, detecting that time slot A1 is empty, they stop monitoring time slot A2, thereby reducing the computational effort. In accordance with the invention, if base station 201 has at least one paging message to be sent for wireless terminals associated with a super time slot, base station 201 never has an empty time slot before a time slot in which paging messages are transported, so that wireless terminals 203-1 through 203-4, in this example, do not miss any transmitted paging messages because of detecting an empty time slot that precedes a time slot including a paging message.

It is noted that in the unique super time slot format of FIGS. 3 and 4 congestion may occur at a super time slot because of fluctuations in the paging message traffic. One possible technique for minimizing this congestion is to use a super time slot having a larger number of time slots. Unfortunately, use of more time slots in the super time slots requires more computation in order to monitor the super time slot for paging messages by the wireless terminals 203.

Figure 5:
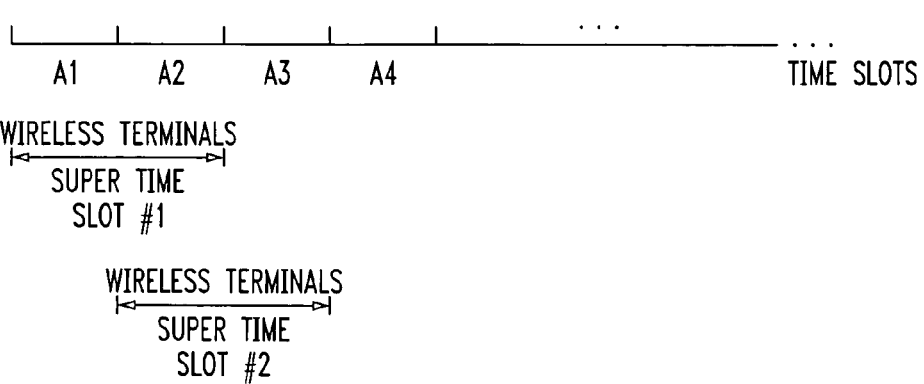
FIG. 5 shows a unique partially overlapping super time slot format in which adjacent super time slots have at least one time slot in common.

FIG. 5 shows a unique partially overlapping super time slot format in which adjacent super time slots have at least one time slot in common. Wireless terminals 203 monitor their associated super time slots to detect paging messages. By way of an example, super time slot #1 includes time slots A1 and A2, super time slot #2 includes time slots A2 and A3, and so forth, and wireless terminals 203-1 and 203-2 share super time slot #1, wireless terminals 203-3 and 203-4 share super time slot #2 and so forth. Consequently, in this example, time slot A2 in common to both super time slot #1 and super time slot #2. Because of this partially overlapping of time slots by the super time slots the paging traffic messages loads on the super time slots can be balanced, thereby reducing the probability of congestion at the super time slots.

Figure 6:
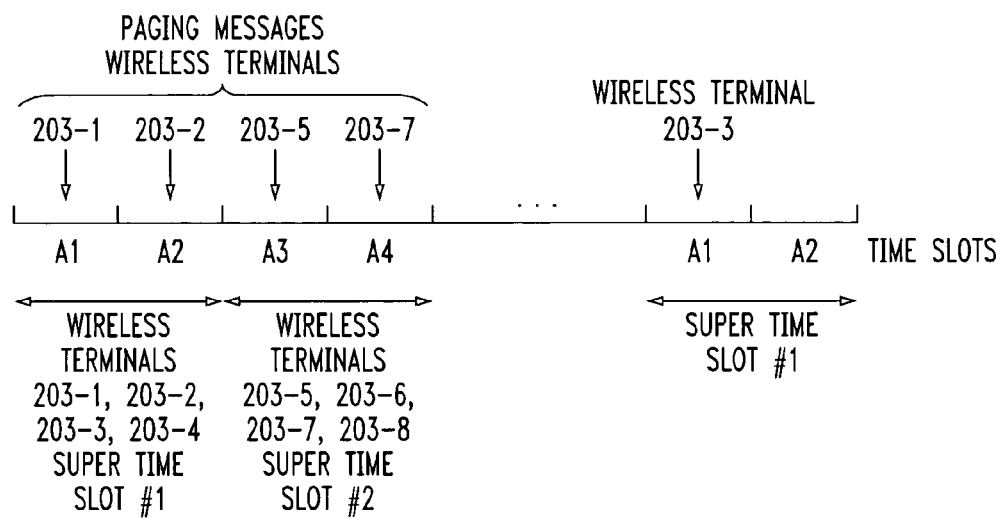
FIG. 6 illustrates the unique non-overlapping super time slot format of FIGS. 3 and 4 and its use in practicing the invention.
Figure 7:
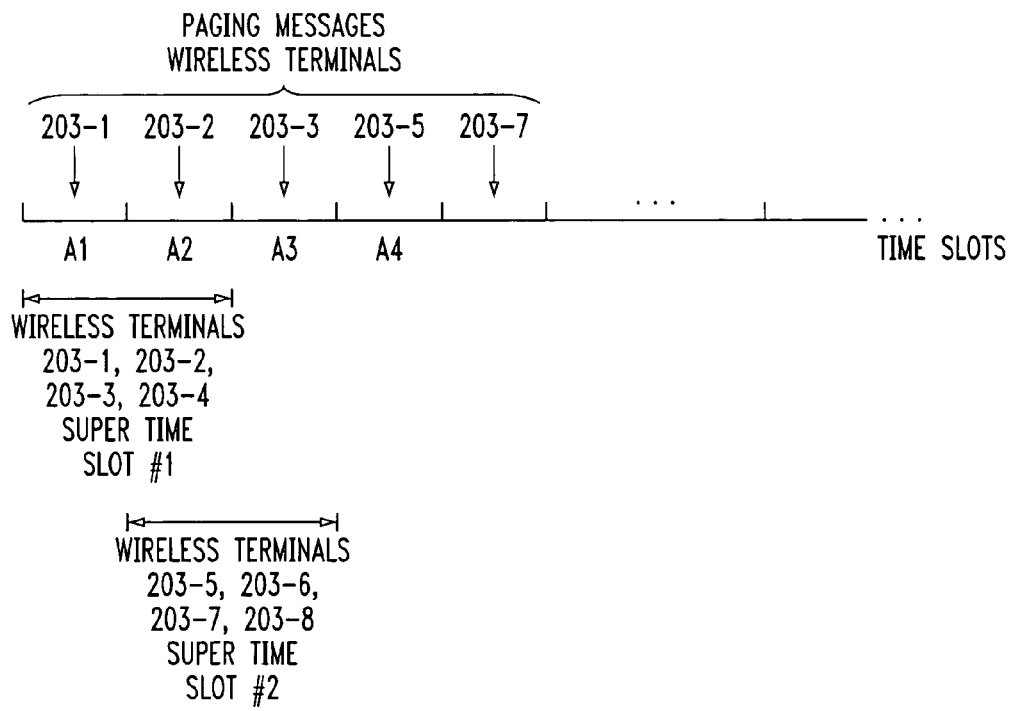
FIG. 7 illustrates the unique partially overlapping super time slot format in which adjacent super time slots have at least one time slot in common and its use in practicing the invention.

FIG. 6 illustrates the unique non-overlapping super time slot format of FIGS. 3 and 4, and its use in practicing the invention. Assume that base station 201 has paging messages to be transmitted to wireless terminals 203-1, 203-2, 203-3, 203-5 and 203-7. The paging messages for wireless terminals 203-1, 203-2, 203-5 and 203-7 are transmitted in time slots A1, A2, A3 and A4, respectively. However, the paging message for wireless terminal 201-3 has to be transmitted in the next occurring super time slot #1 because of congestion in the current super time slot #1. Thus, it is seen that the paging message for wireless terminal 203-3 is transmitted in the first available time slot in its associated super time slot #1 that, in this example, is in the next super time slot cycle FIG. 7 illustrates the unique partially overlapping super time slot format in which adjacent super time slots have at least one time slot in common and its use in practicing the invention. Again, assume that base station 201 has paging messages to be transmitted to wireless terminals 203-1, 203-2, 203-3, 203-5 and 203-7. The paging messages for wireless terminals 203-1, 203-2, 203-3, 203-5 and 203-7 are transmitted in time slots A1, A2, A3, A4, and A5, respectively. Therefore, it is seen that the use of the unique partially overlapping super time slot format results in less latency in receiving and detecting the paging messages in wireless terminals 203-1, 203-2, 203-3, 203-5 and 203-7.

Figure 8:
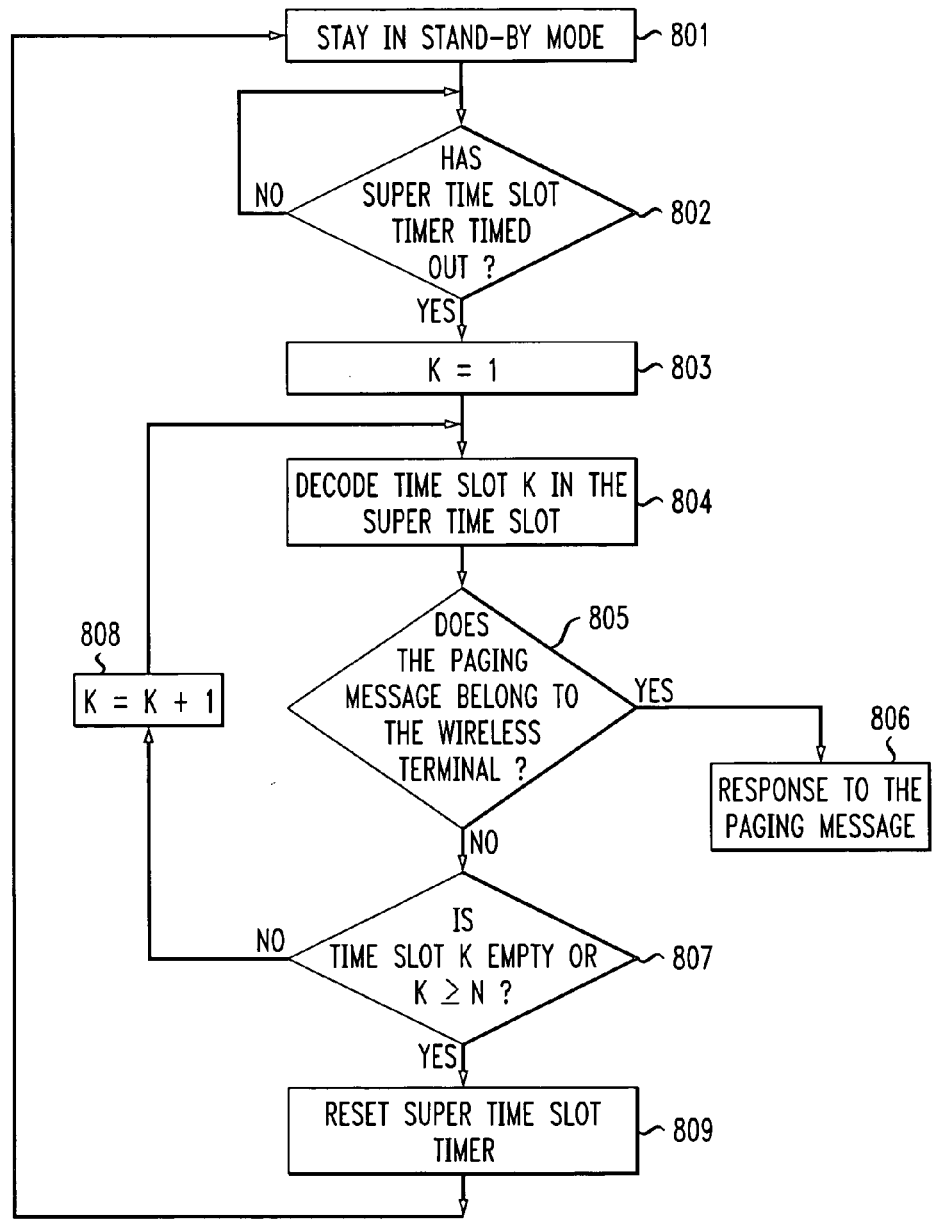
FIG. 8 is a flow chart illustrating steps in the process of a wireless terminal receiving and responding to a paging message.

FIG. 8 is a flow chart illustrating steps in the process of a wireless terminal 203 receiving, detecting and responding to a paging message. The process begins in the power saving mode, i.e., sleep mode, in step 801. Thereafter, step 802 tests to determine if a super time slot timer has timed out. If the test result in step 802 is NO, step 802 is repeated until it yields a YES result indicating the super time slot timer has timed out. The timing out of the super time slot timer indicates to the associated wireless terminal 203 that has to turn ON, i.e., wake up, in order to monitor its associated super time slot to detect if it has received any paging messages. Then, step 803 causes a time slot index for the current super time slot to be set to K=1. Step 804 causes the associated wireless terminal 203 to decode any paging message in time slot K of the super time slot. Step 805 tests to determine if any decoded paging message is for the particular wireless terminal 203. If the test result in step 805 is YES, the paging message is for this particular wireless terminal 203 and step 806 causes the particular wireless terminal 203 to respond. If the test result in step 805 is NO, step 807 tests to determine if time slot K is empty or if K≧N. N represents the number of time slots in a super slot. If the test result in step 807 is NO, step 808 causes the wireless terminal 203 to set the time slot index to K=K+1, and then control is returned to step 804 and appropriate ones of steps 804 through 808 are iterated until either step 805 or step 807 yields a YES result. Again, if step 805 yields a YES result, step 806 responds accordingly, as described above. If step 807 yields a YES result, step 809 resets the super time slot timer and control is returned to step 801, which causes the wireless terminal 203 to enter the sleep mode. Thereafter, appropriate ones of steps 801 through 809 are iterated, as described above.

FIG. 9 is a flow chart illustrating the steps in a process of a base station 201 generating and transmitting paging messages to wireless terminals 203. The process is begun in step 901 by base station 201 generating a paging message for a particular intended wireless terminal 203. Then, step 902 causes base station 201 to wait for the next super time slot associated with the intended wireless terminal 203. This is realized by step 903 testing to determine if a super time slot timer has timed out. If the test result in step 903 is NO, step 903 is iterated until it yields a YES result. The YES result in step 903 indicated that a super time slot has arrived and step 904 causes base station 201 to set a time slot index for the current super time slot to K=1. Then, step 905 tests to determine whether there is a paging message for another wireless terminal 203 having an associated super time slot prior in time, i.e., earlier, to the super time slot for the particular intended wireless terminal 203. A super time slot is prior in time, i.e., earlier, to another super time slot if the last time slot of the former super time slot precedes the last time slot of the latter super time slot. Two super time slots are "contemporary" if their last time slots completely overlap. If the test result in step 905 is NO, step 906 causes base station 201 to transmit the paging message to the particular intended wireless terminal 203. If the test result in step 905 is YES, step 907 causes base station 201 to transmit a paging message to the other wireless terminal 203 indicated in step 905. (Not shown in FIG. 9, if there is a paging message for another wireless terminal 203 having an associated super time slot, which is contemporary with the super time slot for the intended wireless terminal 203, base station 201 may choose to transmit either of the paging messages on a random basis.) Thereafter, step 908 tests to determine whether time slot index K≧N. N represents the number of time slots in a super slot. If the test result in step 908 is NO, step 909 causes base station 201 to set the time slot index to K=K+1 and control is returned to step 905. Thereafter, appropriate ones of steps 905 through 909 are iterated until either step 905 yields a NO result or step 908 yields a YES result. If step 905 yields a NO result, step 906 causes base station 201 to transmit the paging message to the particular intended wireless terminal 203, as described above. When step 908 yields a YES result, step 910 causes base station 201 to rest the super time slot timer and control is returned to step 902. Then, appropriate ones of steps 902 through 910 are iterated, as described above.

The above-described embodiments are, of course, merely illustrative of the principles of the invention. Indeed, numerous other methods or apparatus may be devised by those skilled in the art without departing from the spirit and scope of the invention. Moreover, the invention may be implemented as hardware, as an integrated circuit, via programming on a microprocessor, on a digital signal processor or the like.

What is claimed is:

1. Apparatus for use in a wireless terminal of a wireless communications system to receive paging messages comprising:
    a controller for controllably maintaining said wireless terminal in a standby mode of operation;
    a receiver for receiving a super time slot format including a plurality of cyclically recurring super time slots to transport paging messages to one or more wireless terminals, wherein each of said plurality of super time slots includes a plurality of time slots, each time slot intended to transport a wireless terminal paging message;
    wherein said controller controllably causes said wireless terminal to enter into a monitor mode for monitoring at least a portion of a received super time slot associated with said wireless terminal for a paging message intended for said wireless terminal and otherwise returning to said standby mode of operation,
    wherein the super time slot format allows the paging message intended for said wireless terminal to be included in any one of the plurality of time slots of the received super time slot associated with said wireless terminal,
    wherein power consumption is reduced,
    wherein said controller causes said wireless terminal to enter said standby mode responsive to determining that:
        a given time slot in said portion of said received super time slot associated with said wireless terminal does not include any message; and
        no time slot preceding said given time slot in said portion of said received super time slot associated with said wireless terminal includes a paging message intended for said wireless terminal, and
    wherein said portion of said received super time slot comprises two or more time slots.

2. The apparatus as defined in claim 1 wherein said controller determines whether said super time slot associated with said wireless terminal includes a paging message intended for said wireless terminal.

3. The apparatus defined in claim 2 wherein said wireless terminal includes a transmitter and said controller controls said wireless terminal to transmit a paging response message via said transmitter when it is determined that said super time slot associated with said wireless terminal includes a paging message intended for said wireless terminal.

4. The apparatus as defined in claim 3 wherein said controller causes said wireless terminal to enter said standby mode when it is determined that said super time slot does not include a paging message intended for said wireless terminal.

5. The apparatus as defined in claim 2 wherein said controller is equipped to determine when a time slot in said super time slot does not include any message and further causes said wireless terminal to be in said standby mode upon detecting that at least one time slot does not include a message.

6. The apparatus as defined in claim 1 wherein said plurality of time slots is non-overlapping.

7. The apparatus as defined in claim 1 wherein adjacent ones of said super time slots have one or more time slots in common.

8. A method for use in a wireless terminal of a wireless communications system to receive paging messages comprising the steps of:
    maintaining said wireless terminal in a standby mode of operation;
    receiving a super time slot format including a plurality of cyclically recurring super time slots to transport paging messages to one or more wireless terminals, wherein each of said plurality of super time slots includes a plurality of time slots, each time slot intended to transport a wireless terminal paging message; and
    monitoring at least a portion of a received super time slot associated with said wireless terminal for a paging message intended for said wireless terminal and otherwise returning to said standby mode of operation,
    wherein the super time slot format allows the paging message intended for said wireless terminal to be included in any one of the plurality of time slots of the received super time slot associated with said wireless terminal,
    wherein power consumption is reduced,
    wherein said step of monitoring includes a step of returning to said standby mode of operation responsive to determining that:
        a given time slot in said portion of said received super time slot associated with said wireless terminal does not include any message; and
        no time slot preceding said given time slot in said portion of said received super time slot associated with said wireless terminal includes a paging message intended for said wireless terminal, and
    wherein said portion of said received super time slot comprises two or more time slots.

9. The method as defined in claim 8 wherein said step of monitoring includes a step of determining whether said super time slot associated with said wireless terminal includes a paging message intended for said wireless terminal.

10. The method as defined in claim 9 further including a step of transmitting a paging response message when it is determined that said super time slot associated with said wireless terminal includes a paging message intended for said wireless terminal.

11. The method as defined in claim 9 further including a step of causing said wireless terminal to enter said standby mode when it is determined that said super time slot does not include a paging message intended for said wireless terminal.

12. The method as defined in claim 9 wherein said step of monitoring includes a step of determining when a time slot in said super time slot does not include any message and further causes said wireless terminal to be in said standby mode upon detecting that at least one time slot does not include a message.

13. The method as defined in claim 8 wherein said plurality of time slots is non-overlapping.

14. The method as defined in claim 8 wherein adjacent ones of said super time slots have one or more time slots in common.

15. Apparatus for use in a wireless terminal of a wireless communications system to receive paging messages comprising:
    means for controllably maintaining said wireless terminal in a standby mode of operation;
    means for receiving a super time slot format including a plurality of cyclically recurring super time slots to transport paging messages to one or more wireless terminals, wherein each of said plurality of super time slots includes a plurality of time slots, each time slot intended to transport a wireless terminal paging message;

means for monitoring at least a portion of a received super time slot associated with said wireless terminal for a paging message intended for said wireless terminal, wherein the super time slot format allows the paging message intended for said wireless terminal to be included in any one of the plurality of time slots of the received super time slot associated with said wireless terminal, and wherein power consumption is reduced; and means for returning said wireless terminal to said standby mode responsive to determining that:
- a given time slot in said portion of said received super time slot associated with said wireless terminal does not include any message; and
- no time slot preceding said given time slot in said portion of said received super time slot associated with said wireless terminal includes a paging message intended for said wireless terminal and wherein said portion of said received super time slot comprises two or more time slots.

16. The apparatus as defined in claim 15 further including means for determining whether said super time slot associated with said wireless terminal includes a paging message intended for said wireless terminal.

17. The apparatus as defined in claim 16 further including means for transmitting a paging response message when it is determined that said super time slot associated with said wireless terminal includes a paging message intended for said wireless terminal.

18. The apparatus as defined in claim 16 wherein said means for controllably maintaining said wireless terminal in a standby mode of operation causes said wireless terminal to enter said standby mode when it is determined that said super time slot does not include a paging message intended for said wireless terminal.

19. The apparatus as defined in claim 15 wherein said plurality of time slots is non-overlapping.

20. The apparatus as defined in claim 15 wherein adjacent ones of said super time slots have one or more time slots in common.

* * * * *